(12) United States Patent
Jeon et al.

(10) Patent No.: US 8,568,636 B2
(45) Date of Patent: Oct. 29, 2013

(54) MULTILAYER FILM

(75) Inventors: Min Ho Jeon, Daejeon (KR); Ji Eun Yoo, Daejeon (KR); Moon Jung Choi, Seoul (KR); Kwang Jin Chung, Daejeon (KR); Myung Ahn Ok, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 19 days.

(21) Appl. No.: 13/218,220

(22) Filed: Aug. 25, 2011

(65) Prior Publication Data

US 2012/0058346 A1 Mar. 8, 2012

(30) Foreign Application Priority Data

Sep. 3, 2010 (KR) .................. 10-2010-0086276
Aug. 4, 2011 (KR) .................. 10-2011-0077928

(51) Int. Cl.
*B29C 47/06* (2006.01)

(52) U.S. Cl.
USPC .............. 264/173.16; 264/171.1; 264/172.12; 264/173.11; 264/173.12; 264/173.15; 264/173.17; 264/177.13; 264/241; 264/288.4; 264/291

(58) Field of Classification Search
USPC .............. 264/171.1, 172.12, 173.11, 173.12, 264/173.15, 173.17, 177.13, 173.16, 241, 264/288.4, 291

See application file for complete search history.

(56) References Cited

U.S. PATENT DOCUMENTS

| | | | | |
|---|---|---|---|---|
| 4,482,586 A | * | 11/1984 | Smith et al. | 215/12.2 |
| 4,643,925 A | * | 2/1987 | Smith et al. | 428/36.6 |
| 5,102,734 A | * | 4/1992 | Marbrow et al. | 428/349 |
| 5,681,514 A | * | 10/1997 | Woody | 264/104 |
| 5,849,401 A | * | 12/1998 | El-Afandi et al. | 428/215 |
| 6,268,026 B1 | * | 7/2001 | Jester et al. | 428/1.6 |
| 6,312,823 B1 | * | 11/2001 | El-Afandi et al. | 428/480 |
| 6,358,579 B1 | * | 3/2002 | Peiffer et al. | 428/35.7 |
| 6,426,128 B1 | * | 7/2002 | Kimmel et al. | 428/1.6 |
| 6,503,549 B1 | * | 1/2003 | Mueller | 426/396 |
| 6,645,584 B1 | * | 11/2003 | Kuusipalo et al. | 428/34.2 |
| 6,881,375 B2 | * | 4/2005 | Topolkaraev et al. | 264/555 |
| 6,896,843 B2 | * | 5/2005 | Topolkaraev et al. | 264/555 |
| 7,288,312 B2 | * | 10/2007 | Peiffer et al. | 428/212 |
| 7,678,444 B2 | * | 3/2010 | Tedford et al. | 428/212 |
| 7,951,438 B2 | * | 5/2011 | Lee et al. | 428/35.8 |
| 7,998,385 B2 | * | 8/2011 | Yamane et al. | 264/173.15 |
| 8,246,878 B2 | * | 8/2012 | Sun et al. | 264/211 |
| 8,388,331 B2 | * | 3/2013 | Osada et al. | 425/133.5 |
| 2012/0305083 A1 | * | 12/2012 | Dahl et al. | 137/1 |

* cited by examiner

*Primary Examiner* — Christina Johnson
*Assistant Examiner* — Saeed Huda
(74) *Attorney, Agent, or Firm* — The Webb Law Firm

(57) ABSTRACT

The present invention relates to a multilayer film coextruded from an aliphatic polycarbonate and polylactic acid-based polymer and a method for producing the same. According to the present invention, a multilayer film having excellent adhesive property can be manufactured even without a separate adhesive layer.

5 Claims, 3 Drawing Sheets

MULTILAYER FILM

TECHNICAL FIELD

The present invention relates to a multilayer film coextruded from an aliphatic polycarbonate and polylactic acid-based polymer and a method for producing the same.

BACKGROUND ART

Aliphatic polycarbonate is excellent in oxygen-barrier property, transparency, and the like, but is difficult to use as a single film due to a low $T_g$, which needs to be, in most cases, laminated with other resin at the time of use. However, in order to make the aliphatic polycarbonate be laminated with other kinds of resins such as PE, PP, or the like, when an appropriate adhesive capable of adhering two kinds of resins are used for lamination or coextrusion, a resin for a tie layer capable of adhering the two kinds of resins is needed.

The polylactic acid-based polymer may be variously used as films, sheets, fibers, or the like, due to biodegradability and inherent physical properties thereof, but is limited in a packaging field requiring prevention of acidification due to large oxygen permeability thereof.

DISCLOSURE

Technical Problem

An object of the present invention is to provide a multilayer film having an excellent adhesive property between interfaces and no longer requiring a separate adhesive or tie layer, by coextruding aliphatic polycarbonate and polylactic acid-based polymer.

Specifically, the present invention can impart excellent oxygen barrier property, low-temperature heat adhesive property, and printability, as compared with a molded body using a polylactic acid-based polymer, and provide a molded body capable of reducing the cost of raw materials because an adhesive or a tie layer is not required and significantly decreasing the manufacturing cost because the constitution of layers is simplified.

In addition, the present invention is to provide a shrinking film obtained by stretching the molded body, that is, a film or a sheet, uniaxially or biaxially at a predetermined temperature.

Technical Solution

The present invention is directed to a molded body in which aliphatic polycarbonate and polylactic acid-based polymer are laminated, and more particularly to a sheet type or a film type of multilayer film.

The present inventors confirmed that, when coextruding aliphatic polycarbonate and polylactic acid-based polymer, two layers adhere well to each other and are hardly delaminated from each other even without an adhesive and a tie layer, and as a result, completed the present invention.

Therefore, the present inventors found that, in a case where aliphatic polycarbonate and polylactic acid-based polymer are laminated in a multilayer structure, oxygen barrier property, low-temperature heat seal property, and printability can be provided as compared with a case where the polylactic acid-based polymer alone is used. Here, the cost of raw materials can be reduced because an adhesive or a tie resin is not required and the manufacturing cost can be significantly decreased because the constitution of layers is simplified.

In addition, the present inventors confirmed that, when a molded body having this lamination structure of aliphatic polycarbonate and polylactic acid-based polymer thus formed, that is, a film or a sheet is uniaxially or biaxially stretched at a predetermined temperature, shrinkage thereof occurs above a predetermined temperature, and thus, this molded body can be used as a shrinking film, and as a result, completed the present invention.

Specifically, the present invention is directed to a multilayer film consisting of two or more layers, in which an aliphatic polycarbonate layer containing aliphatic polycarbonate and a polylactic acid-based polymer layer containing polylactic acid-based polymer are laminated.

More specifically, the present invention will be described with reference to the drawings.

One general aspect of the present invention, as shown in FIG. 1, provides a double-layer structure of film or sheet in which an aliphatic polycarbonate layer 10 containing aliphatic polycarbonate and a polylactic acid-based polymer layer 20 containing polylactic acid-based polymer on one surface thereof are laminated.

Another general aspect of the present invention, as shown in FIG. 2, provides a three-layer structure of film or sheet laminated in which a polylactic acid-based polymer layer 20 containing polylactic acid-based polymer and aliphatic polycarbonate layers 10 containing aliphatic polycarbonate on both surfaces of the polylactic acid-based polymer layer 20 are laminated.

Another general aspect of the present invention, as shown in FIG. 3, provides a three-layer structure of film or sheet in which an aliphatic polycarbonate layer 10 containing aliphatic polycarbonate and polylactic acid-based polymer layers 20 containing polylactic acid-based polymer on both surfaces of the aliphatic polycarbonate layer 10 are laminated.

Another general aspect of the present invention, as shown in FIG. 4, provides a four-layer structure of film or sheet in which an aliphatic polycarbonate layer 10 containing aliphatic polycarbonate/a polylactic acid-based polymer layer 20 containing polylactic acid-based polymer/an aliphatic polycarbonate layer 10 containing aliphatic polycarbonate/a polylactic acid-based polymer layer 20 containing polylactic acid-based polymer are laminated.

Another general aspect of the present invention, as shown in FIG. 5, provides a five-layer structure of film or sheet in which an aliphatic polycarbonate layer 10 containing aliphatic polycarbonate/a polylactic acid-based polymer layer 20 containing polylactic acid-based polymer/an aliphatic polycarbonate layer 10 containing aliphatic polycarbonate/a polylactic acid-based polymer layer 20 containing polylactic acid-based polymer/an aliphatic polycarbonate layer 10 containing aliphatic polycarbonate are laminated.

Another general aspect of the present invention, as shown in FIG. 6, provides a five-layer structure of film or sheet in which a polylactic acid-based polymer layer 20 containing polylactic acid-based polymer/an aliphatic polycarbonate layer 10 containing aliphatic polycarbonate/a polylactic acid-based polymer layer 20 containing polylactic acid-based polymer/an aliphatic polycarbonate layer 10 containing aliphatic polycarbonate/a polylactic acid-based polymer layer 20 containing polylactic acid-based polymer are laminated.

However, these aspects are only for clearly illustrating the constitution of the present invention, but are not intended to limit the present invention. The present invention is not limited only in cases of a structure having two or more layers.

In addition, an appropriate additive such as a slip agent, a blocking preventing agent, or the like, may be further introduced to an outer layer of the multilayer film in order to impart slipping property and prevent blocking, and the kind thereof is not limited.

In the present invention, the lamination means to be formed by coextrusion, and since adhesive property between aliphatic polycarbonate and polylactic acid-based polymer is excellent, the aliphatic polycarbonate and the polylactic acid-based polymer are laminated through coextrusion to provide a multilayer film having excellent adhesive property even without an adhesive layer or a tie layer.

Another aspect of the present invention is a multilayer film capable of being used as a shrinking film by uniaxially and biaxially stretching the above multilayer film. The multilayer film according to the present invention has a shrinkage ratio in a stretch direction of 5 to 70% when it is uniaxially or biaxially stretched and then submerged in a warm water bath at 70 to 100° C. for 30 seconds, and is appropriate for use as a shrinkage film.

Hereinafter, constitutions of the present invention will be described in more detail.

In the present invention, as the aliphatic polycarbonate, polycarbonate copolymer or terpolymer obtained by reacting carbon dioxide and one, or two or more kinds of epoxide compounds may be used. Herein, the epoxide compound may be one or more selected from the group consisting of (C2-C10) alkylene oxide substituted or unsubstituted with halogen or alkoxy; (C4-C20) cycloalkylene oxide substituted or unsubstituted with halogen or alkoxy; and (C8-C20) styrene oxide substituted or unsubstituted with halogen alkoxy, alkyl, or aryl.

Specific examples of the alkoxy may include alkyloxy, aryloxy, aralkyloxy, and the like, and specific examples of the aryloxy may include phenoxy, biphenyloxy, naphthyloxy, and the like. The alkoxy, alkyl, and aryl may have a substituent selected from halogen atoms and alkoxy groups.

In the present invention, specific examples of the epoxide compound may include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-octene, epifluorohydrin, epichlorohydrin, epibromohydrin, isopropyl glycidyl ether, butyl glycidyl ether, t-butyl glycidyl ether, 2-ethylhexylglycidyl ether, allyl glycidyl ether, cyclopenetene oxide, cyclohexene oxide, cyclooctene oxide, cyclododecene oxide, alpha-pinene oxide, 2,3-epoxy norbornene, lemonene oxide, dieldrine, 2,3-epoxy propylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxypropyl ether, epoxypropyl methodyphenyl ether, biphenyl glycidyl ether, glycidyl naphthyl ether, and the like.

The polycarbonate copolymer or terpolymer may be polymerized by using solution polymerization or bulk polymerization, and more specifically, may be polymerized by using an organic solvent as a reaction medium in the presence of one or more kinds of epoxide compounds and catalyst while carbon dioxide is inputted. As the solvent, one alone or a combination of two or more selected from aliphatic hydrocarbons, such as pentane, octane, decane, cyclohexane, and the like, aromatic hydrocarbons, such as benzene, toluene, xylene, and the like, and halogenated hydrocarbons, such as chloromethane, methylene chloride, chloroform, carbontetrachloride, 1,1-dichloroethane, 1,2-dichloroethane, ethylchloride, trichloroethane, 1-chloropropane, 2-chloropropane, 1-chlorobutane, 2-chlorobutane, 1-chloro-2-methylpropane, chlorobenzene, bromobenzene, and the like, may be used. A pressure of the carbon dioxide is possible from an atmospheric pressure to 100 atm, and preferably from 5 atm to 30 atm. A polymerization temperature at the time of copolymerizing reaction may be 20 to 120° C., and preferably 50 to 90° C. More preferably, bulk polymerization using a monomer itself as a solvent may be performed.

The aliphatic polycarbonate copolymer may have a glass transition temperature (Tg) of 0 to 40° C., and the terpolymer may have a glass transition temperature of 0 to 110° C. In addition, a weight average molecular weight is preferably 50,000 to 500,000, a melt index (MI) (ASTM D-1238, 150° C. 5 kg) is 0.1 to 200 g/10 min, and preferably 1 to 50 g/10 min, and a molecular weight distribution (Mw/Mn) is 1.3 or more, and preferably 2.5 or more. If the MI is very high, extrusion stability and layer formation are unstable, and stretch uniformity is deteriorated. If the MI is very low, an extrusion rate is slowed due to excessive extrusion load. In addition, if the molecular weight distribution becomes widened, a melt curtain of the polymer ejected from a die may be stably formed, and the extrusion load is lowered and thus the extrusion rate may be heightened.

More specifically, as the aliphatic polycarbonate, polyalkylene carbonate may be used, and particularly, polypropylene carbonate may be advantageous because oxygen barrier property thereof is excellent and shrinkage property thereof can be easily regulated.

In the present invention, a polylactic acid-based polymer containing 80 wt % or more of L-lactic acid may be used as the polylactic acid-based polymer. If the content of L-lactic acid is below 80 wt %, a heat-resistant property thereof is remarkably deteriorated. As the polylactic acid-based polymer, a PLA polymer series or the like of Nature Works Company may be used, but the polylactic acid-based polymer is not limited thereto.

In the present invention, the aliphatic polycarbonate resin and the polylactic acid-based polymer are prepared and coextruded as resin compositions, respectively. Here, the resin composition may be prepared in a type of master batch pallet.

As occasion demands, an additive commonly used in manufacturing films or sheets, such as a pigment, a dye, a filler, an antioxidant, a UV blocker, an antistatic agent, an antiblocking agent, a slip agent, or the like, may be added into the resin composition, and the kind thereof is not limited.

Next, a method of producing the multilayer film of the present invention will be described in more detail.

In another general aspect, a method for producing a multilayer film, includes: a) preparing a first resin composition containing aliphatic polycarbonate; b) preparing a second resin composition containing polylactic acid-based polymer; and c) melting the first resin composition and the second resin composition and then coextruding the first resin composition and the second resin composition using a T-die, blown, or tubular type of extruder.

In addition, the method may further include: d) stretching the coextruded sheet uniaxially or biaxially, after step C), as necessary.

In the present invention, a preferable melt temperature range at the time of coextrusion is 120 to 210° C. for the aliphatic polycarbonate, and 180 to 250° C. for the polylactic acid-based polymer. The coextrusion is performed by using a T-die, blown, or tubular type of extruder. If the melt temperature thereof is below the above temperature range, an adhesive strength between layers is decreased. If the melt temperature thereof is above the above temperature range, excessive thermal degradation may occur to generate bubbles due to products of the thermal degradation in the sheet.

In addition, two or more layers are laminated by regulating a form of the die at the time of coextrusion, and the number of layers is not limited.

More specifically, for example, two layers of a first resin composition/a second resin composition, three layers of a first resin composition/a second resin composition/a first resin composition, three layers of a second resin composition/a first resin composition/a second resin composition, four layers of a first resin composition/a second resin composition/a first resin composition/a second resin composition, five layers of a first resin composition/a second resin composition/a first resin composition/a second resin composition/a first resin composition, or five layers of a second resin composition/a first resin composition/a second resin composition/a first resin composition/a second resin composition may be laminated.

In the present invention, the stretching is performed at 60 to 90° C. with a stretch ratio of 2 to 6 times, thereby producing a multilayer film applicable as a shrinking film having shrinking property. Here, the stretching may be performed by the known methods, such as roll stretching or tenter stretching, or simultaneous biaxial stretching or successively biaxial stretching.

Advantageous Effects

The multilayer film according to the present invention no longer requires an adhesive or a tie layer and has improved physical properties due to superior adhesive property of respective resins.

Further, the multilayer film according to the present invention is stretched uniaxially or biaxially, to produce a shrinking film, and the multilayer film according to the present invention is usable as packaging materials or the like.

BEST MODE

Figure 1:
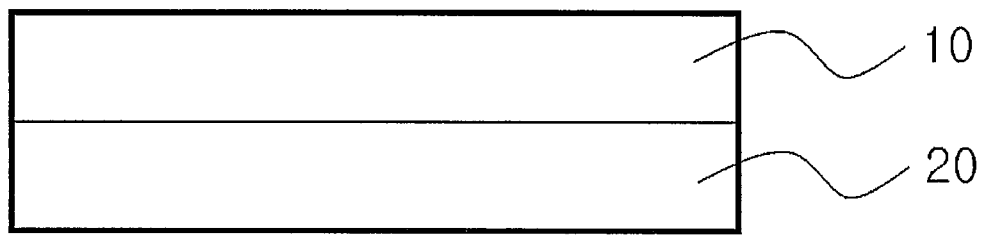
FIG. 1 is a cross-sectional view of a multilayer film having a two-layer structure according to a preferred embodiment of the present invention.
Figure 2:
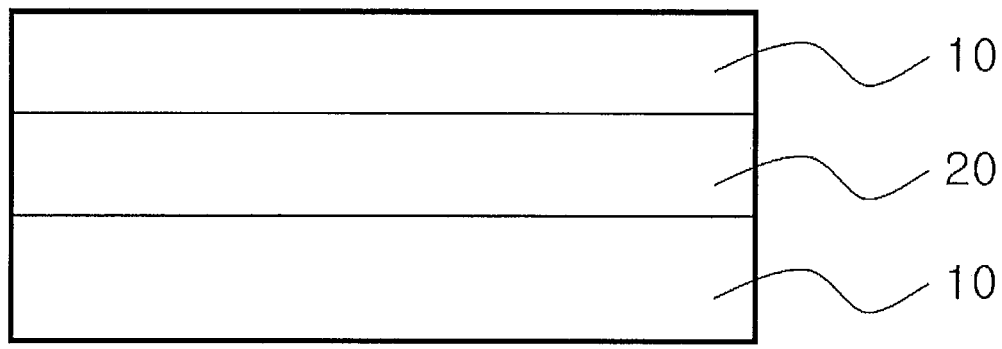
FIG. 2 is a cross-sectional view of a multilayer film having a three-layer structure according to another preferred embodiment of the present invention.
Figure 3:
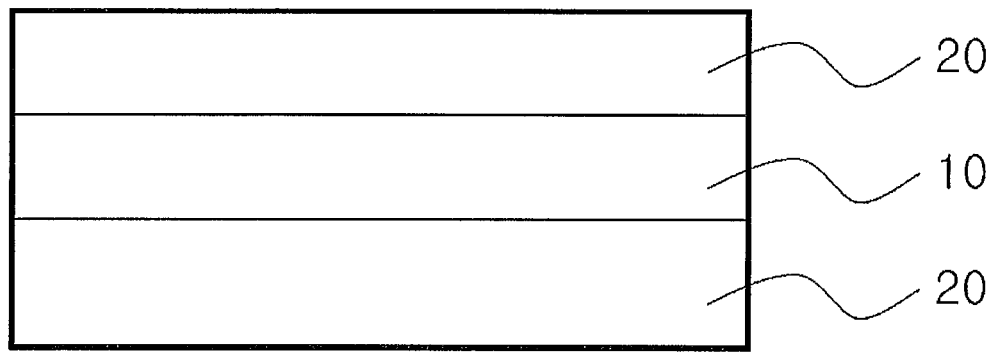
FIG. 3 is a cross-sectional view of a multilayer film having a three-layer structure according to still another preferred embodiment of the present invention.
Figure 4:
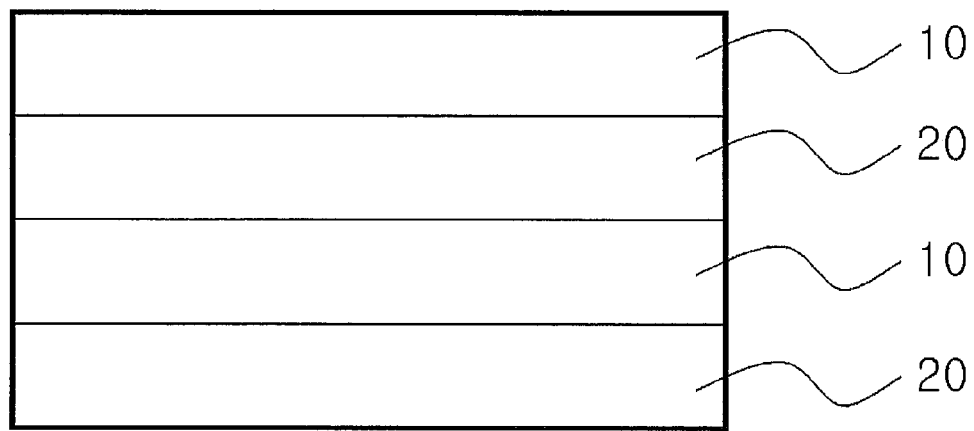
FIG. 4 is a cross-sectional view of a multilayer film having a four-layer structure according to another preferred embodiment of the present invention.
Figure 5:
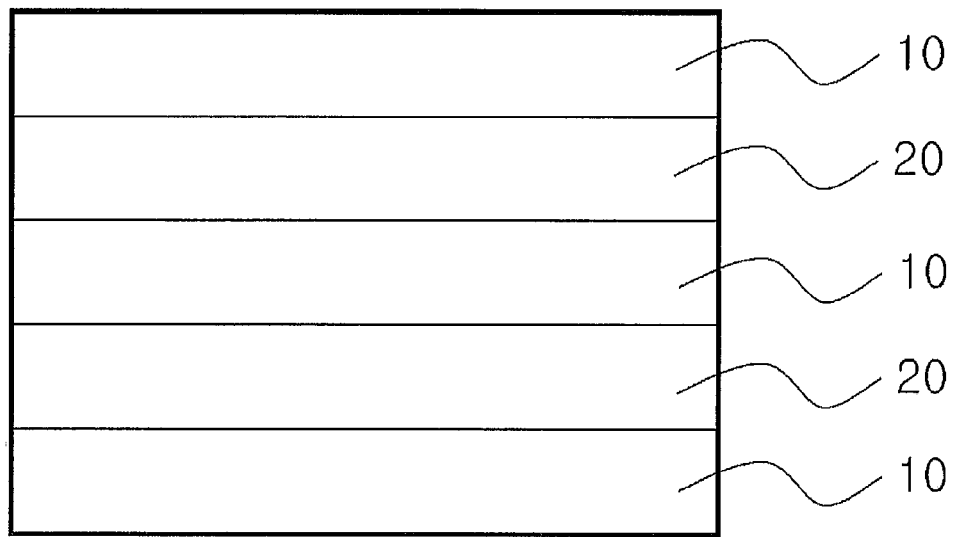
FIG. 5 is a cross-sectional view of a multilayer film having a five-layer structure according to another preferred embodiment of the present invention.
Figure 6:
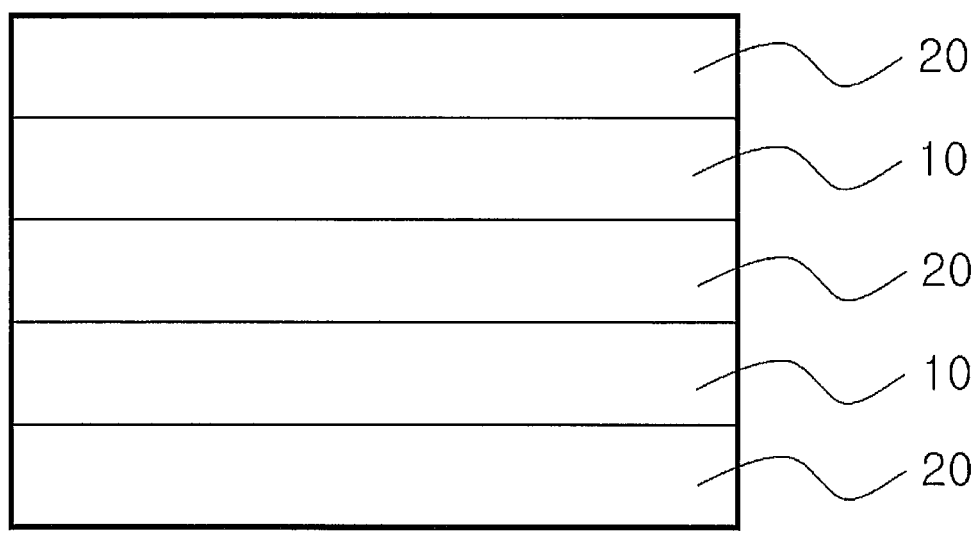
FIG. 6 is a cross-sectional view of a multilayer film having a five-layer structure according to still another preferred embodiment of the present invention.

Hereinafter, the present invention will be described in detail with reference to examples, which is not intended to limit the present invention.

Hereinafter, physical properties were measured by the following methods.

1. Weight Average Molecular Weight

A weight average molecular weight was measured by using Gel Permeability Chromatography using tetrahydrofuran (THF) as a solvent (Room temperature GPC, Agilent 1200 HPLC).

2. Film Thickness

Thicknesses at several points of a multilayer film were measured (TOYOSEIKI Thickness Meter Model: B-1), and an average value thereof was used.

3. Delamination

A multilayer film was cut to a size of 5 cm of width and 20 cm of length, adhesive tapes were attached onto both surfaces of the film such that the adhesive tape overlap all the width of the film and is 5 cm in a length direction. Then, when the adhesive tapes were pulled off from both surfaces of the film in a direction vertical to the surfaces of the film, it is observed whether or not respective layers of the multilayer film are delaminated from each other. A case where respective layers were not laminated from each other, up to three trials, was determined to be not laminated.

4. Tensile Strength, Elongation

Tensile strength and elongation were measured according to ASTM D-638 by using Universal Testing Machine (INSTRON 4301).

5. Haze

A multilayer film was cut to a size having a film width of 7 cm and a film length of 7 cm. Haze was measured two times or more, and an average value thereof was used (Haze Meter 300A, NIPPON DENSHOKU).

6. Oxygen Permeability

Oxygen permeability was measured by using MOCON OX-TRAN equipment (Model 2161).

7. Water Vapor Permeability

Water Vapor Permeability was measured by using MOCON PERMATRAN-W equipment (Model 3133).

8. Film Shrinkage Ratio

The stretched multilayer film was cut to a size having a film width of 6 cm and a film length of 6 cm, which was then retained in a warm water bath at which a temperature was uniformly maintained, for a predetermined time period (30 seconds), and then a length difference thereof was measured.

EXAMPLE 1

A three-layer film of PLA/PPC/PLA was produced by putting polypropylene carbonate (PPC, produced by SK Energy Company, terpolymer obtained by reacting carbon dioxide, propylene oxide and cyclohexene oxide) having a weight average molecular weight of 180,000 and PLA 4032D of Natureworks Company, which is polylactic acid-based polymer, into an extruder, followed by melting and then coextrusion through T-die. Here, at the time of coextrusion, the polypropylene carbonate was melt extruded at an extruder temperature of 140° C. (Cylinder 1)-170° C. (Cylinder 2)-180° C. (Cylinder 3)-180° C. (Die), and the polylactic acid-based polymer was melt extruded at an extruder temperature of 180° C. (Cylinder 1)-180° C. (Cylinder 2)-200° C. (Cylinder 3)-200° C. (Die).

As the measurement result, the produced multilayer film had a thickness of 68.1 μm.

Physical properties of the produced film were measured and the results were tabulated in Table 1.

EXAMPLE 2

A multilayer film was produced by the same method as Example 1, except that thicknesses of respective layers were regulated to 50 μm/80 μm/60 μm at the time of coextrusion, and the produced sheet was stretched in the mechanical direction and the transverse direction with a stretch ratio of 3×3 times, respectively, by using a biaxial stretcher at 85° C.

Physical properties of the produced film were measured and the results were tabulated in Table 1.

EXAMPLE 3

A multilayer film was produced by the same method as Example 2, except that stretching is performed with a stretch ratio of 3×4 times.

Physical properties of the produced film were measured and the results were tabulated in Table 1.

TABLE 1

|  | Unit | Example 1 | Example 2 | Example 3 |
|---|---|---|---|---|
| Delamination |  | Not delaminated | Not delaminated | Not delaminated |
| Film thickness | µm | 68.1 | 20 | 15 |
| Tensile strength (MD) | Kg/cm² | 548 | 1100 | 1050 |
| Tensile strength (TD) | Kg/cm² | 577 | 1220 | 1100 |
| Elongation (MD) | % | 9.4 | 80 | 100 |
| Elongation (TD) | % | 1.9 | 50 | 40 |
| Haze | % | 2.4 | 1.0 | 1.0 |
| Oxygen permeability (23° C., RH 0%) | cc/m²day | 63 | 197 | 250 |
| Water vapor permeability (38° C., 100% RH) | g/m²day | 187 | 350 | 376 |

As shown in Table 1, it can be seen that mechanical properties were improved and haze was lowered to increase transparency in the biaxially stretched film, as compared with the non-stretched film, and oxygen permeability and water vapor permeability were inversely proportional to the thickness of the stretched film.

EXAMPLE 4

A multilayer film was produced by preparing a sheet having the same thickness as Example 2 and then regulating a stretch ratio and a stretch temperature as shown in Table 2 below. The film thus produced was submerged within a warm water bath at 70 to 100° C. for 30 seconds, and a shrinkage ratio of each film was measured.

The results were tabulated in Table 2.

TABLE 2

| Stretch ratio (MD × TD) | Stretch temperature (° C.) | Water bath temperature (° C.) | MD Shrinkage ratio (%) | TD Shrinkage ratio (%) |
|---|---|---|---|---|
| 1 × 3 | 70 | 70 | 1.7 | 5 |
| 1 × 3 | 70 | 80 | 1.7 | 5 |
| 1 × 3 | 70 | 90 | 3.3 | 11.7 |
| 1 × 3 | 70 | 100 | 3.3 | 8.3 |
| 1 × 3 | 80 | 70 | 0 | 1.7 |
| 1 × 3 | 80 | 80 | 0 | 1.7 |
| 1 × 3 | 80 | 90 | 1.7 | 5 |
| 1 × 3 | 80 | 100 | 1.7 | 10 |
| 1 × 3 | 90 | 70 | 0 | 1.7 |
| 1 × 3 | 90 | 80 | 0 | 1.7 |
| 1 × 3 | 90 | 90 | 1.7 | 1.7 |
| 1 × 3 | 90 | 100 | 1.7 | 3.3 |
| 3 × 1 | 70 | 70 | 8.0 | 4.0 |
| 3 × 1 | 70 | 80 | 16.0 | 8.0 |
| 3 × 1 | 70 | 90 | 6.0 | 4.0 |
| 3 × 4 | 70 | 70 | 23 | 30 |
| 3 × 4 | 70 | 80 | 37 | 28 |
| 3 × 4 | 70 | 90 | 38 | 43 |
| 3 × 4 | 70 | 100 | 47 | 45 |
| 3 × 4 | 80 | 70 | 23 | 29 |
| 3 × 4 | 80 | 80 | 30 | 38 |
| 3 × 4 | 80 | 90 | 35 | 43 |
| 3 × 4 | 80 | 100 | 40 | 47 |
| 3 × 4 | 90 | 70 | 20 | 27 |
| 3 × 4 | 90 | 80 | 15 | 29 |
| 3 × 4 | 90 | 90 | 21 | 33 |
| 3 × 4 | 90 | 100 | 25 | 38 |

As shown in Table 2, it can be seen that biaxial stretching further increases the shrinkage ratio as compared with uniaxial stretching and, at the same stretch ratio, the shrinkage ratio is increased as the stretch temperature becomes lowered.

EXAMPLE 5

The same equipment and resin as Example 1 were used to prepare a sheet in which a PPC layer was thickened. Thicknesses of respective layers, PLA/PPC/PLA=14 µm/142 µm/21 µm, and total thickness was 176 µm. The films thus produced were uniaxially stretched at stretch temperatures of 60 and 70° C., and the stretched films were submerged within warm water bathes of 70, 80, and 90° C. for 30 seconds. Then, shrinkage ratio of each film was measured.

The results were tabulated in Table 3.

TABLE 3

| Stretch ratio (MD × TD) | Stretch temperature (° C.) | Water bath temperature (° C.) | MD shrinkage ratio (%) | TD shrinkage ratio (%) |
|---|---|---|---|---|
| 3 × 1 | 60 | 70 | 46.0 | 4.0 |
| 3 × 1 | 60 | 80 | 46.0 | 4.0 |
| 3 × 1 | 60 | 90 | 50.0 | 4.0 |
| 1 × 3 | 70 | 70 | 2.0 | 34.0 |
| 1 × 3 | 70 | 80 | 2.0 | 44.0 |
| 1 × 3 | 70 | 90 | 2.0 | 40.0 |
| 3 × 1 | 70 | 70 | 6.0 | 4.0 |
| 3 × 1 | 70 | 80 | 16.0 | 4.0 |
| 3 × 1 | 70 | 90 | 20.0 | 2.0 |
| 4 × 1 | 70 | 70 | 12.0 | 0.0 |
| 4 × 1 | 70 | 80 | 20.0 | 2.0 |
| 4 × 1 | 70 | 90 | 28.0 | 2.0 |
| 6 × 1 | 70 | 70 | 30.0 | -2.0 |
| 6 × 1 | 70 | 80 | 26.0 | -2.0 |
| 6 × 1 | 70 | 90 | 34.0 | 0.0 |

As shown in Table 3, it can be seen that the shrinkage ratio was increased in general when the thickness of the PPC layer was increased. It can be seen that the shrinkage ratio is increased as the stretch temperature becomes lowered and the shrinkage ratio is large when the shrinkage temperature is high, like Example 4.

EXAMPLE 6

The same equipment and resin as Example 1 were used to produce a five-layer film of PLA/PPC/PLA/PPC/PLA. Here, at the time of coextrusion, the polypropylene carbonate was melt extruded at an extruder temperature of 140° C. (Cylinder 1)-170° C. (Cylinder 2)-180° C. (Cylinder 3)-180° C. (Die), and the polylactic acid-based polymer was melt extruded at an extruder temperature of 180° C. (Cylinder 1)-180° C. (Cylinder 2)-200° C. (Cylinder 3)-200° C. (Die).

The produced multilayer film has a thickness of 105 μm (20.5 μm/18.2 μm/20.2 μm/19.1 μm/21.2 μm), and physical properties of the produced film were measured, and the results were tabulated in Table 4.

TABLE 4

|  | Unit | Example 1 | Example 6 |
|---|---|---|---|
| Delamination |  | Not delaminated | Not delaminated |
| Film thickness | μm | 68.1 | 99.2 |
| Tensile strength (MD) | Kg/cm$^2$ | 548 | 712 |
| Tensile strength (TD) | Kg/cm$^2$ | 577 | 750 |
| Elongation (MD) | % | 9.4 | 12 |
| Elongation (TD) | % | 1.9 | 2.4 |
| Haze | % | 2.4 | 3.3 |
| Oxygen permeability (23° C., RH 0%) | cc/m$^2$day | 63 | 42 |
| Water vapor permeability (38° C., 100% RH) | g/m$^2$day | 187 | 120 |

As shown in comparison between Example 1 and Example 6, as the thickness of the PPC layers became increased due to multilayer lamination of PPC, oxygen barrier property and water barrier property were improved and tentile strength was improved.

The invention claimed is:

1. A method for producing a multilayer film, comprising:
    a) preparing a first resin composition containing aliphatic polycarbonate;
    b) preparing a second resin composition containing polylactic acid-based polymer; and
    c) melting the first resin composition and the second resin composition and then coextruding the first resin composition and the second resin composition using a T-die, blown, or tubular type of extruder,
    wherein the first resin composition is melt extruded at 120 to 210° C. and the second resin composition is melt extruded at 180 to 250° C., at the time of coextrusion.

2. The method of claim 1, wherein the first resin composition and the second resin composition are laminated in two or more layers at the time of coextrusion.

3. The method of claim 1, further comprising:
    d) stretching the coextruded sheet uniaxially or biaxially, after step C).

4. The method of claim 3, wherein the coextrusion is performed to provide a two-layer structure of a first resin composition/a second resin composition, and a three-layer structure of a second resin composition/a first resin composition/a second resin composition.

5. The method of claim 3, wherein the multilayer film is uniaxially or biaxially stretched at 60 to 90° C. with a stretch ratio of 2 to 6 times.

* * * * *